Patented Apr. 8, 1924.

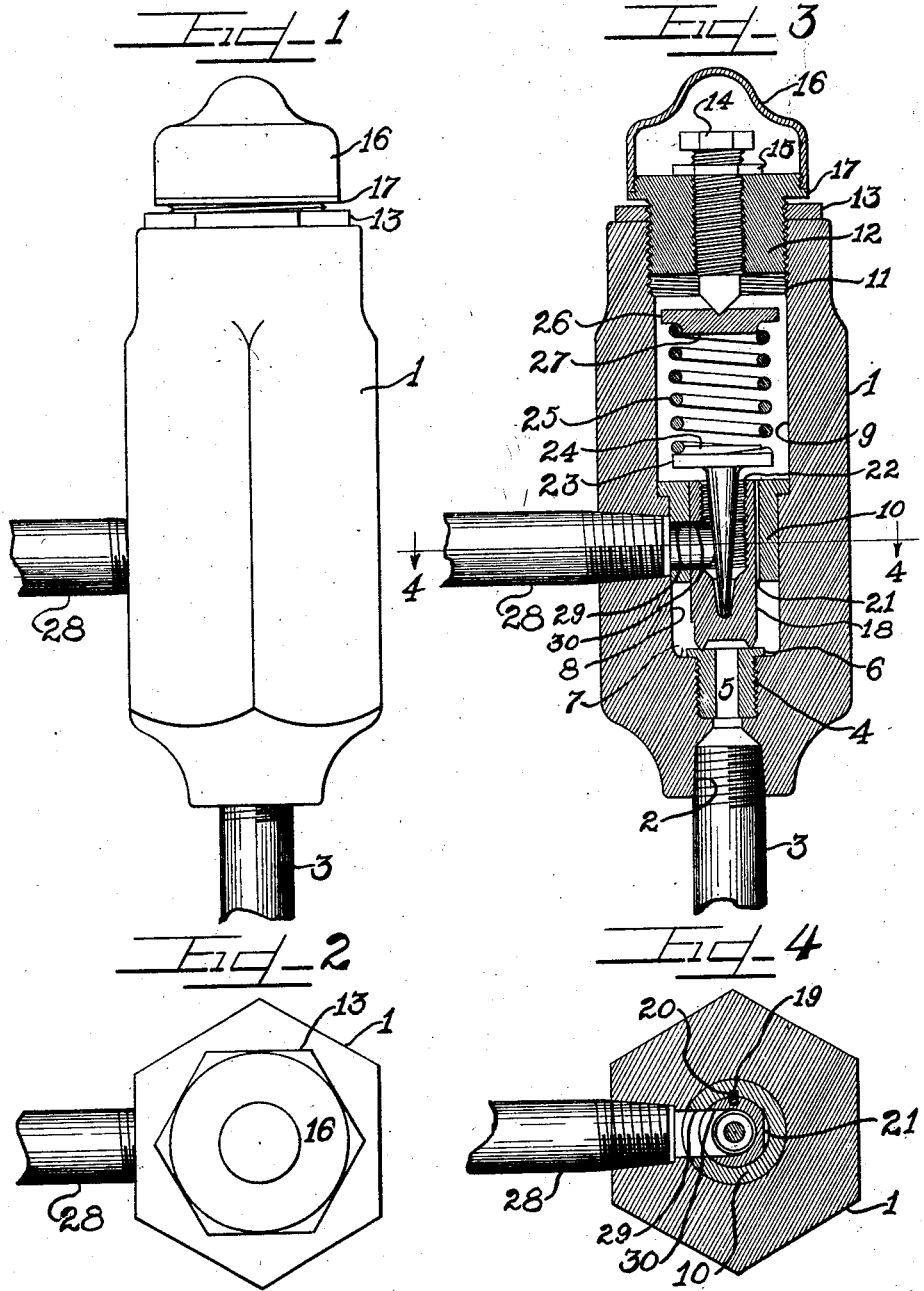

1,489,488

UNITED STATES PATENT OFFICE.

AXEL F. ERICKSON, OF CHICAGO, ILLINOIS, ASSIGNOR OF ONE-THIRD TO MILES C. ST. JOHN, OF CHICAGO, ILLINOIS.

SAFETY RELIEF VALVE.

Application filed August 19, 1922. Serial No. 582,871.

*To all whom it may concern:*

Be it known that I, AXEL F. ERICKSON, a citizen of the United States, and a resident of the city of Chicago, in the county of Cook and State of Illinois, have invented certain new and useful Improvements in a Safety Relief Valve; and I do hereby declare that the following is a full, clear, and exact description of the same, reference being had to the accompanying drawings, and to the numerals of reference marked thereon, which form a part of this specification.

This invention relates to safety or relief valves for high pressure vessels wherein a minimum loss of the contents is desirable for any reason. It has special reference to safety valves for vessels containing expensive or dangerous liquids or gases, such, for example, as ammonia refrigerating systems wherein a loss of the refrigerant means not only the release of a dangerous gas but a waste of expensive material.

Heretofore the safety valves used on such special installations have borne a strong resemblance to the ordinary pop safety valves used on steam boilers. Such valves necessarily open at one pressure, which is adjustable to the individual requirements, and close at a much lower pressure, thus blowing off a considerable quantity of steam in the case of boilers. With many high pressure processes, as, for example, refrigerating systems, such a loss of liquids or gases must be avoided as far as possible.

It is an important object of this invention to construct a pressure relief valve that will open at a predetermined pressure and close after only a very slight drop in pressure thus conserving the contents of the vessel.

It is a further important object of this invention to provide a quick seating balanced relief valve having a very small range between the opening and closing pressures.

It is still a further important object of this invention to provide a by-passed relief valve wherein when said valve is open, the sum of the spring pressure and the fluid pressure on the top of the valve will be sufficient to close said valve after a very slight drop in pressure within the pressure vessel.

Another important object of this invention is to provide a self-seating valve that will seat securely even after long usage.

A further important object of this invention is to provide a simple, easily adjusted, easily and cheaply manufactured relief valve.

Other and further important objects of this invention will be apparent from the disclosures in the specification and the accompanying drawings.

The invention (in a preferred form) is illustrated in the drawings and hereinafter more fully described.

On the drawings:

Figure 1 is an elevation of a preferred form of a device embodying this invention.

Figure 2 is a top plan view of this device.

Figure 3 is a section on the center line of Fig. 1.

Figure 4 is a section on the line 4—4 of Figure 3.

As shown on the drawings:

The preferred form of this invention comprises a substantially cylindrical body designated by the numeral 1 having a cylindrical bore therethrough of varying diameters. The bottom of the body 1 is tapped at 2 to receive a pipe connection 3 leading to a pressure vessel (not shown). Just above this pipe the body is internally threaded at 4 to receive a shouldered and passaged relatively soft metal bushing 5 which serves as a renewable valve seat. The shoulder 6 on this bushing seats on a shoulder 7 within the body formed by an enlargement 8 of the central bore. About midway of the body a further enlargement 9 of the bore serves to locate a shouldered bushing 10 which is securely pressed into place. The upper end of the enlargement 9 is internally threaded at 11 for a shouldered plug 12 which is locked in place by a lock-nut 13. Centrally disposed in said plug 12 is an adjustable cone pointed set screw 14 held in adjusted position by a lock nut 15. A cover 16 is threaded onto the shoulder 17 of the plug 12 to conceal the set screw 14.

The valve mechanism comprises only two moving parts and a spring, and consists of a cup pointed cylindrical valve 18 having a good sliding fit in the bushing 10 and is prevented from turning therein by a pin 19 secured to the valve and sliding in a slot 20 in the bushing. One side of the valve 18 is milled off as at 21 to provide a passage past the valve for the discharge from the pressure vessel. Instead of using a cylindrical valve, a valve of almost any other exterior form can be used, thus eliminating the use of a pin to prevent turning of the valve.

The valve body 18 is recessed as at 22 to receive the end of a spring seat 23 having a centering boss 24 for a coil spring 25 which is held at its upper end by a spring washer 26 having a similar boss 27. As shown, the valve body 10 is internally threaded but this is for ease of handling during machining and has no function in the completed valve.

An outlet pipe connection 28 is tapped into the side of the body 1 and communicates with the valve recess 22 through the registering apertures 29 in the bushing 10 and 30 in the valve body 18.

The operation is as follows:

In use this valve is connected to a pressure vessel by means of the pipe 3 and the pressure within the vessel gradually brought up to the allowable limit at the same time adjusting the set screw 14 until the spring pressure will yield and allow the valve to open at the required pressure. After securing the proper adjustment, the set screw is locked in position by means of the lock nut 15 and the cover 16 applied to the plug 12.

An increase in pressure beyond the limit the valve is adjusted to hold causes a lift of the valve 18 against the action of the spring 25 and part of the fluid or gas within the pressure vessel passes the valve 18 through the passage formed by the flat 21 on the side of the valve and into the spring chamber above the valve, thence into the interior recess 22 of the valve 18 and is discharged through the apertures 30 and 29 into the pipe 28 which forms a vent leading to a distant discharging point in the case of apparatus containing a liquid which yields explosive or noxious vapors.

It will thus be seen that with the valve 18 lifted, substantially uniform pressure exists above and below the valve, thus permitting the spring 25 to reseat the valve. In operation this valve would rapidly flutter rather than be held open until the pressure within the vessel was reduced to a considerable extent, as would be the case with an ordinary pop safety valve.

By making the renewable valve seat of a relatively softer material than the valve, the valve forms its own seat and securely seals the opening anew each time the valve comes down. With refrigerating machines, for example, this is an important feature, as the valve is set to release at pressures considerably above the normal operating pressures and consequently the valve may stand unused for long periods of time, yet it must seat perfectly after blowing off.

I am aware that numerous details of construction may be varied through a wide range without departing from the principles of this invention, and I therefore do not purpose limiting the patent granted otherwise than necessitated by the prior art.

I claim as my invention:

1. A safety relief valve, comprising a hollow body having an inlet connection, a valve seat therein, a spring-controlled valve therefor, a constantly open by-pass from said valve seat around said valve, and an outlet connection in said body communicating with the side of said valve opposite to said inlet connection.

2. A safety relief valve, comprising a hollow body having an inlet connection, a valve seat therein, a spring-controlled valve therefor formed hollow and open at its end opposite said valve seat, a by-pass from said valve seat to said open end of the valve, and a lateral outlet connection communicating with the interior of said valve.

3. A safety relief valve, comprising a hollow body having an inlet connection, a valve seat therein, a valve therefor formed hollow and open at its end opposite said valve seat, a by-pass from said valve seat to said open end of the valve, a spring seat comprising a centering boss loosely disposed in said valve, a spring bearing on said spring seat, means for adjusting the tension of said spring, and an outlet connection communicating with the interior of said valve through alined openings.

In testimony whereof I have hereunto subscribed my name in the presence of two subscribing witnesses.

AXEL F. ERICKSON.

Witnesses:
 CARLTON HILL,
 MILES C. ST. JOHN.